Figure 3:
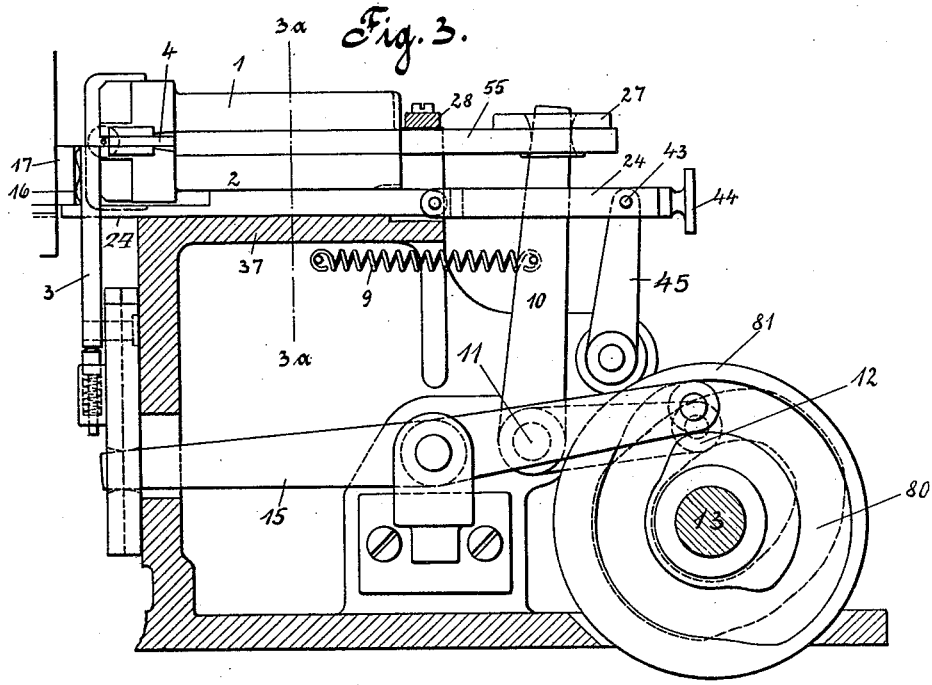

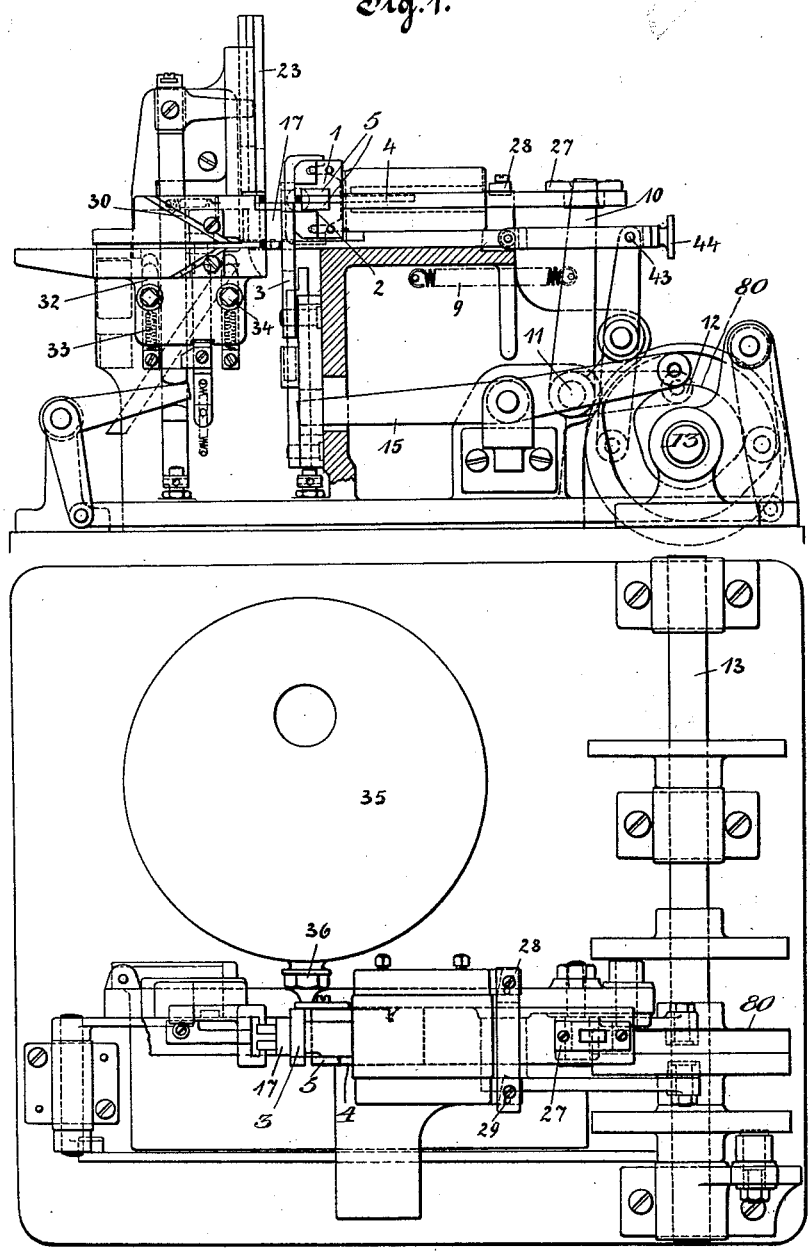

H. DEGENER.
TYPE CASTING MACHINE.
APPLICATION FILED MAY 17, 1909.

1,070,876.

Patented Aug. 19, 1913.
8 SHEETS—SHEET 2.

Witnesses:

Inventor:

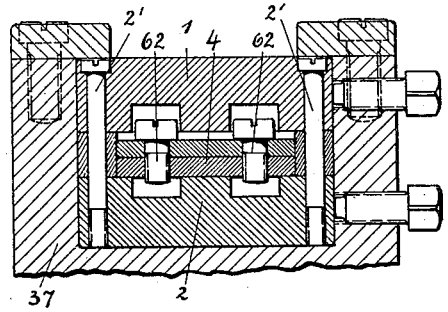
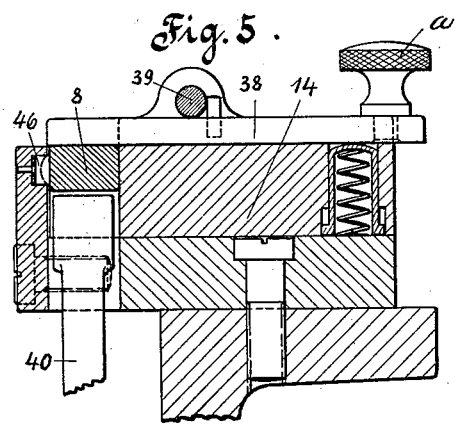
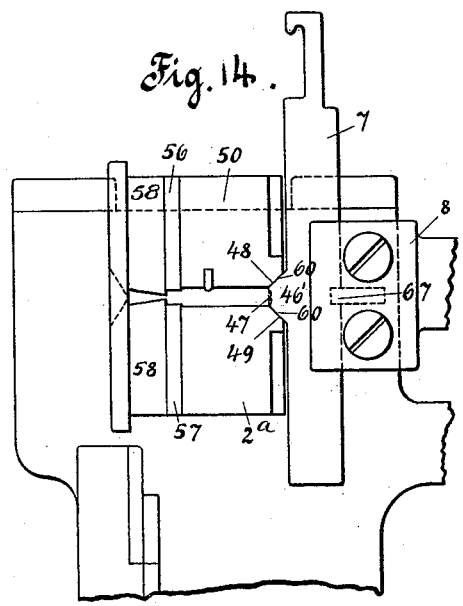
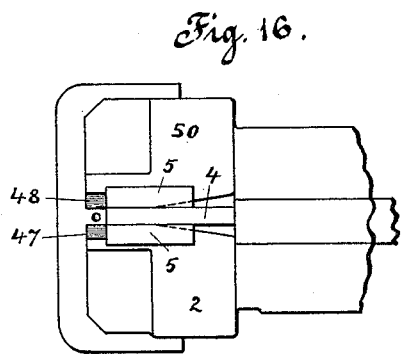
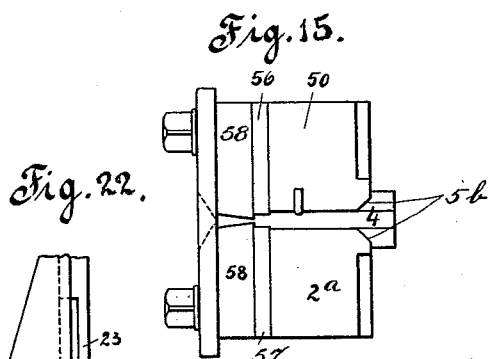
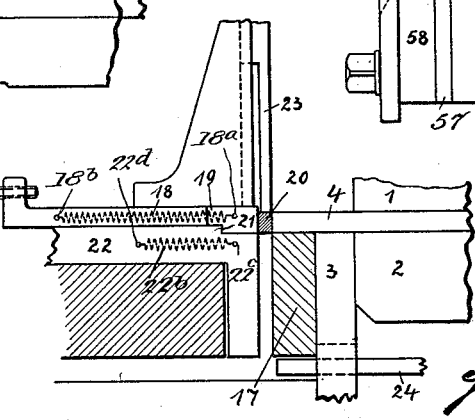

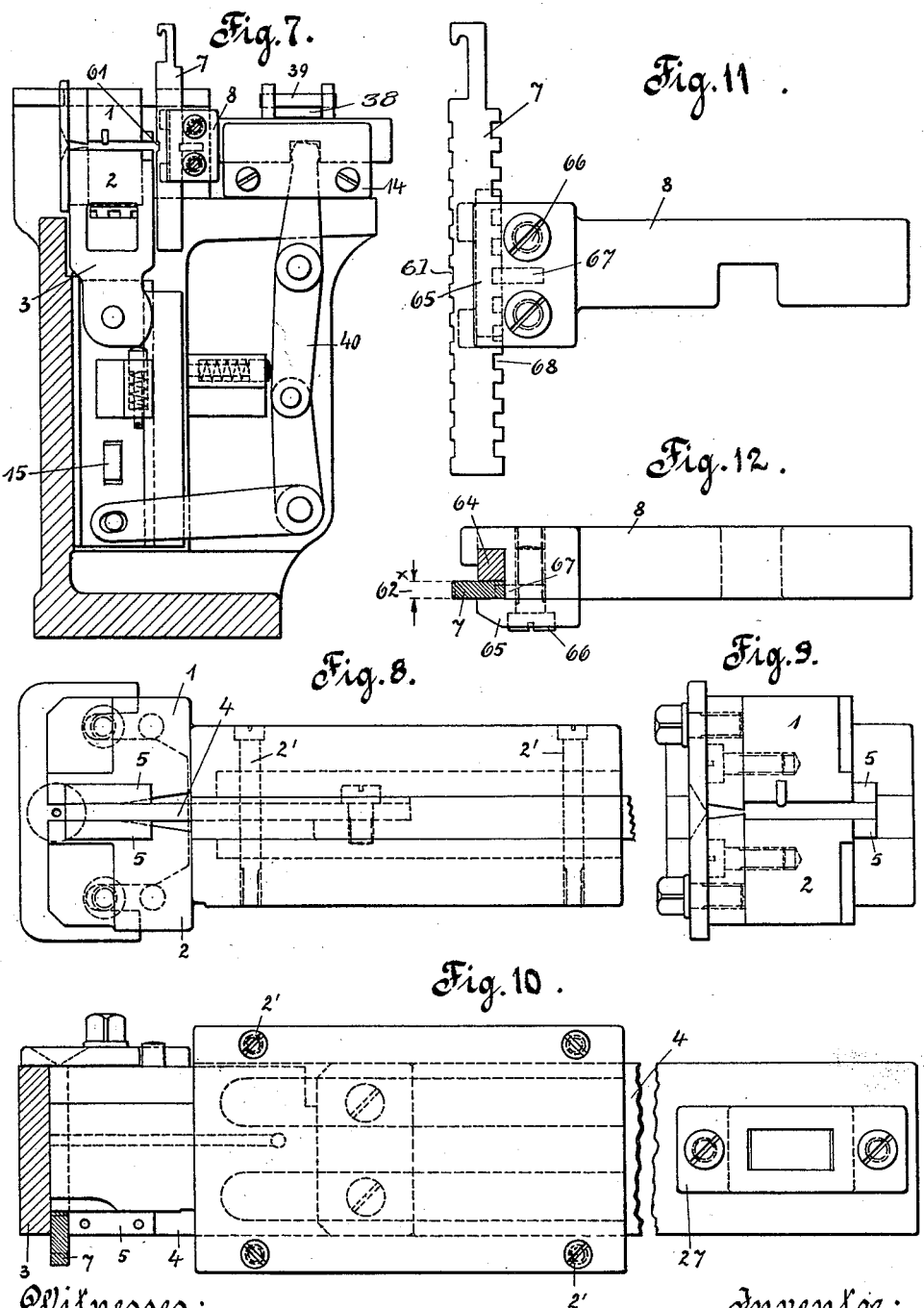

H. DEGENER.
TYPE CASTING MACHINE.
APPLICATION FILED MAY 17, 1909.

1,070,876.

Patented Aug. 19, 1913.
8 SHEETS—SHEET 5.

Witnesses:

Inventor:

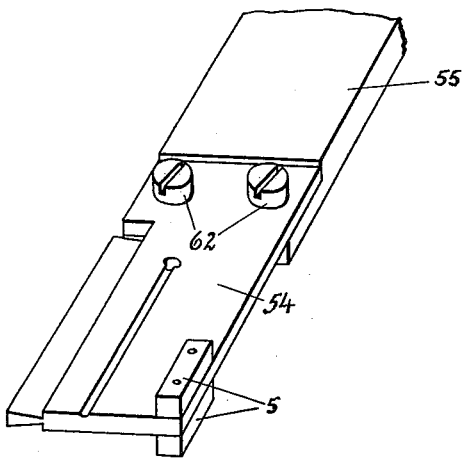
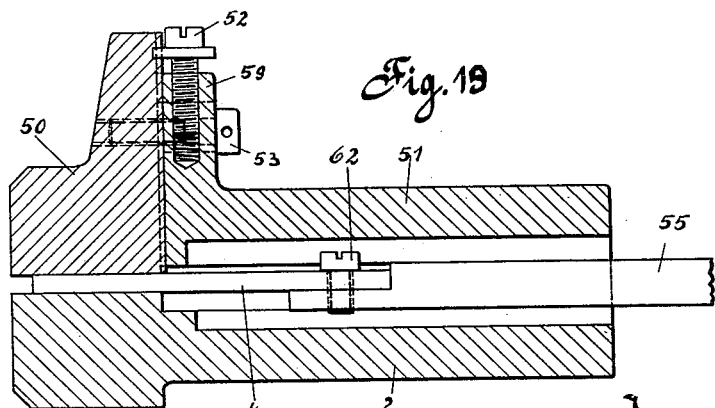

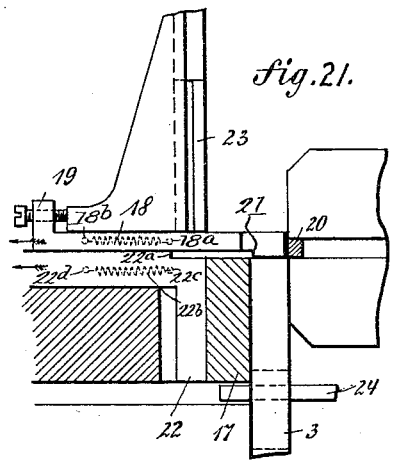
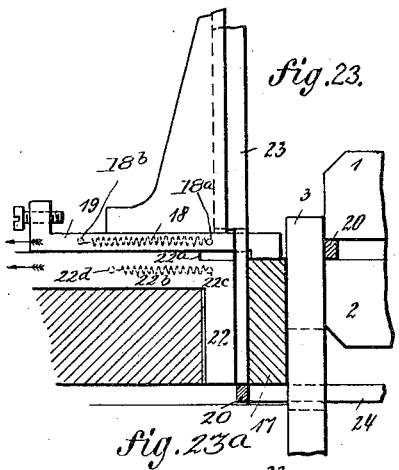
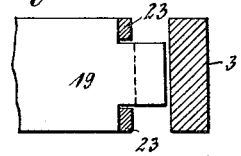
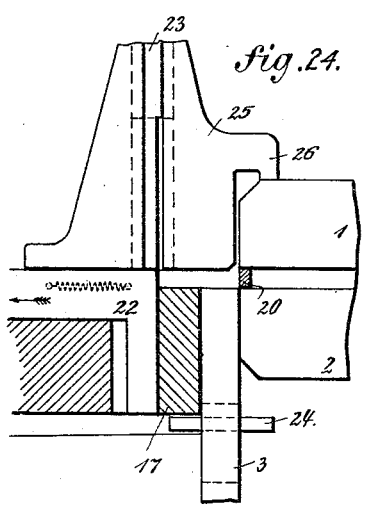
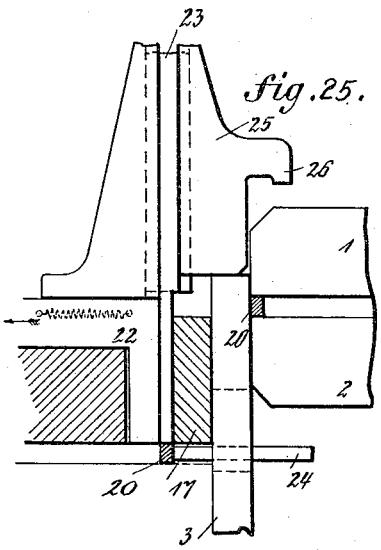

H. DEGENER.
TYPE CASTING MACHINE.
APPLICATION FILED MAY 17, 1909.
1,070,876.
Patented Aug. 19, 1913.
8 SHEETS—SHEET 8.
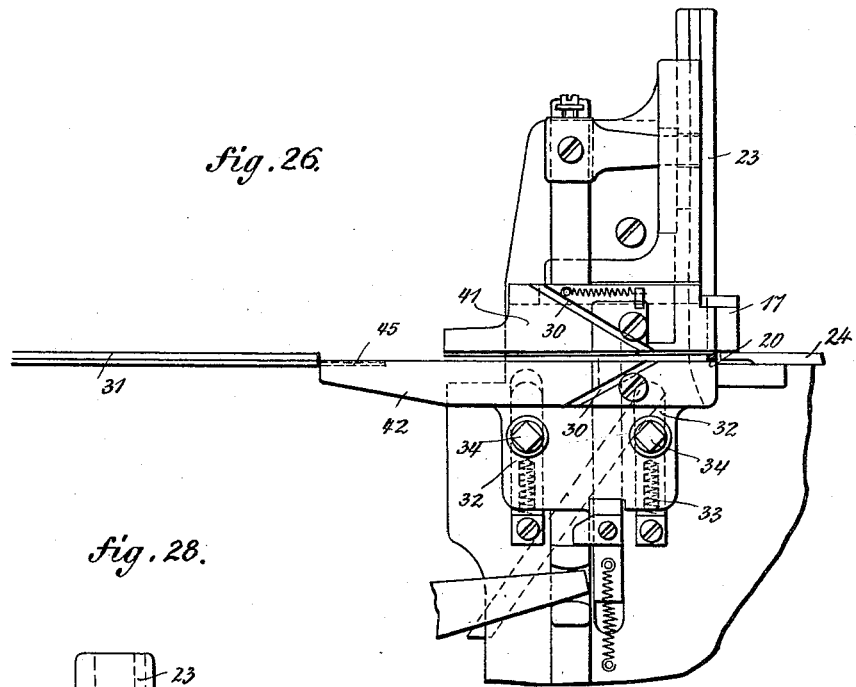
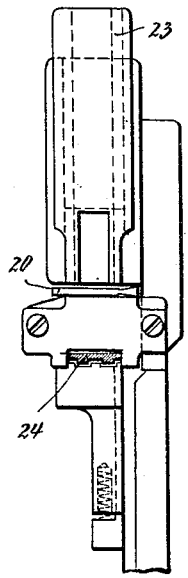
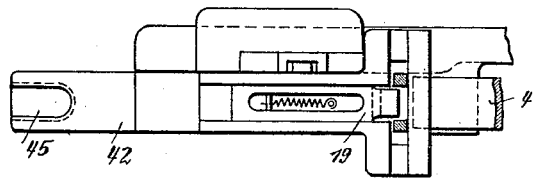
Witnesses:
Inventor:

UNITED STATES PATENT OFFICE.

HEINRICH DEGENER, OF BERLIN, GERMANY, ASSIGNOR TO MERGENTHALER LINOTYPE COMPANY, A CORPORATION OF NEW YORK.

TYPE-CASTING MACHINE.

1,070,876.   Specification of Letters Patent.   Patented Aug. 19, 1913.

Application filed May 17, 1909. Serial No. 496,665.

*To all whom it may concern:*

Be it known that I, HEINRICH DEGENER, 26 Hollmannstrasse, Berlin, German Empire, manager, having invented certain new and useful Improvements in or Relating to Type-Casting Machines, do hereby declare that the following is an exact specification of the same.

This invention relates to type casting machines of the character used in printing offices to produce any quantity or style of type as occasion may demand.

The machine is constructed in such a manner that matrices commonly employed in linotype and like machines may be used for the manufacture of single types. For this purpose the machine differs from the former construction chiefly in the arrangement of the mold. Hitherto the mold consisted of upper and lower parts forming between them a mold cavity or slot, which was closed on one side by a vertically movable slide, and on the other side by an ejector slide. According to my invention I provide these two side parts or slides with projections or the like adapted to receive between them the matrix from which the type is to be cast. As a result of this arrangement, the formation of burs at the side of the type will be prevented. I propose also in accordance with my invention to prevent the formation of burs at the top and bottom of the type as well, by providing that part of the matrix containing the type die, with a projection, and forming the mold to receive the projection with the result that an extended bearing or contact is secured between the matrix and mold which will prevent the escape of the metal between the parts and the consequent formation of burs. With a matrix of this form presented to the mold between said side parts or slides, the matrix is inclosed on all four sides, and a type is produced which is entirely free from projections or burs.

Furthermore, my invention enables types of any desired width to be cast without it being necessary to adjust the separate parts of the mold, the type ejector being pressed yieldingly against the matrix and, therefore, the mold is automatically adjusted in accordance with the setwise width of the type to be produced.

Furthermore, my invention contemplates a construction of the mold by which type-bodies of different heights may be produced.

All of the above-mentioned features are set forth in the following specification, and the preferred constructions for carrying the invention into effect are illustrated in the accompanying drawings. But it will be understood that the invention is not limited to any particular form of construction of the parts, except in so far as such limitations are specified in the claims.

Figure 4:
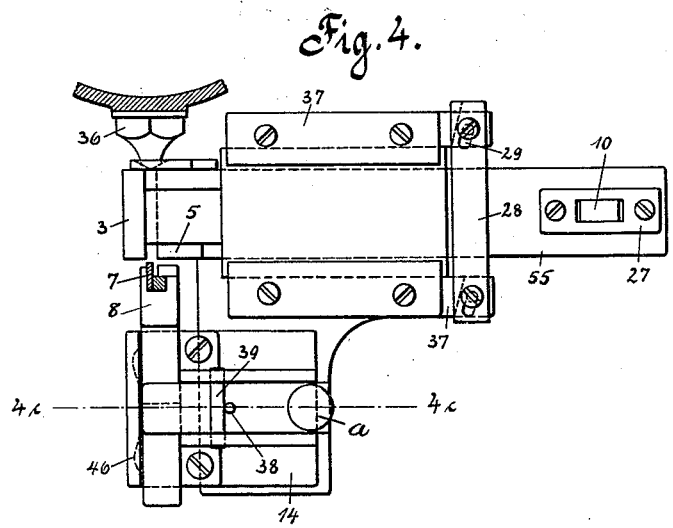
Figure 13:
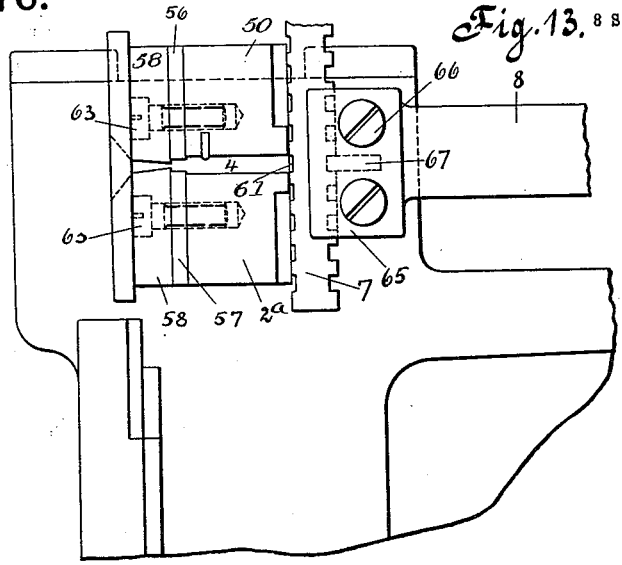
Figure 17:
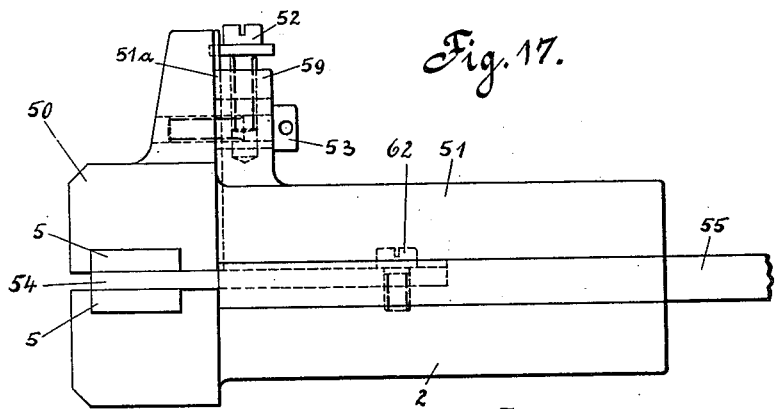
Figure 18:
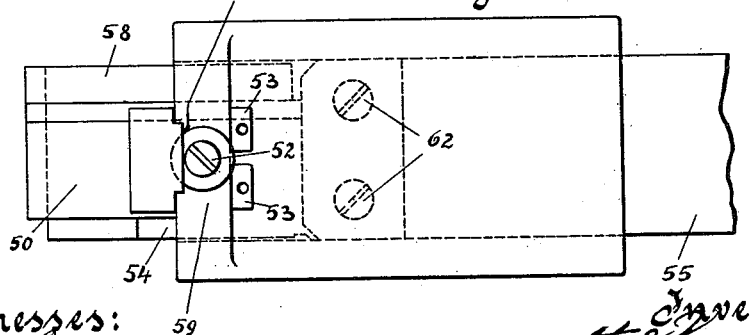

In the accompanying drawings: Figure 1 is a front elevation of the machine, partly in section. Fig. 2 is a top plan view of the same with the matrix holder and other parts removed. Fig. 3 is a front elevation of the machine partly in section on an enlarged scale, with certain of the parts shown in Fig. 1 omitted. Fig. 4 is a top plan view of the same. Fig. 5 is a sectional elevation on the line $4^c$—$4^c$ of Fig. 4. Fig. 6 is a transverse section through the mold structure on the line $3^a$—$3^a$ of Fig. 3. Fig. 7 is an elevation of the machine partly in section, as viewed from the left in Fig. 3. Fig. 8 is a front elevation of the mold on an enlarged scale. Fig. 9 is an end elevation of the same. Fig. 10 is a top plan view of the same with parts in section, showing how the matrix is clamped in front of the mold cell. Fig. 11 is a side elevation of the matrix and its holder. Fig. 12 is a sectional plan view of the same. Fig. 13 is an end elevation on an enlarged scale, of a mold in modified form showing the matrix presented thereto. Fig. 14 is an end elevation of the mold and presented matrix, said parts being so formed that the matrix will project into the mold. Fig. 15 is a view similar to Fig. 14 with the matrix removed. Fig. 16 is a front elevation of the mold in the form shown in the preceding figure. Fig. 17 is a front elevation of a mold in still another modified form. Fig. 18 is a top plan view of the same. Fig. 19 is a sectional view of the same, the section being taken longitudinally through Fig. 18. Fig. 20 is a perspective view of the type ejector. Fig. 21 is an elevation partly in section, of the devices for transferring the type from the mold after its ejection therefrom. Fig. 22 is a similar view with the parts in a different position and the type partially transferred. Fig. 23 is a similar view with the parts in still another position and the type further advanced. Fig. 23ª is a plan view, partly in section, of details of the type transferring device. Fig. 24 is an elevation in section, of a modified form of the devices for transferring the type. Fig. 25 is a similar view with the parts in a different position and the type partially transferred. Fig. 26 is an elevation on an enlarged scale, of the mechanism for trimming the type during their transference, said figure showing also the galley to which the type are finally delivered. Fig. 27 is a top plan view of the parts shown in Fig. 26. Fig. 28 is an elevation of the same, as viewed from the right in Fig. 26.

Referring to the drawings: My improved mold is illustrated in combination with other parts of the machine in Figs. 1 and 2, Figs. 3 and 7 showing the details thereof. The mold consists of the upper part 1 and the lower part 2, said parts being mounted in such manner as to leave between them a mold slot or cavity corresponding to the width of the so-called "body" of the type to be cast. The two parts of the mold may be arranged in such manner that they can be adjusted relatively to each other, but it is preferable to secure them fixedly together, for example, by means of screws 2', so that, when changing from one to another "body" the entire mold will have to be changed, consequently there will be no possibility of a change of "body" by inadvertence. At one side the mold is closed by the vertically movable slide 3, and on the other side by the ejector 4. The ejector is provided at its inner end at the front side of the mold, where the matrix is presented to the latter, with a transverse projection 5 as shown more particularly in Figs. 10 and 20, which extends beyond the mold at the front, and the slide 3 is of such width that it also projects slightly beyond the mold, these two projecting portions being adapted to embrace the matrix between them at the front end of the mold cell, as will be more fully described later on.

The matrix 7, which contains the type character or die, consists of a flat metal plate (see Figs. 11, 12 and 7). On one edge the type character 61 is impressed, and the width 62ˣ of the matrix is the same as the required width of the type to be cast. The matrix illustrated in Figs. 11 and 12 is the well known monoline matrix, but any kind of matrix for line casting machines may be employed for the purposes of my invention. The matrix is brought by means hereinafter more fully described, against the mold in such manner that its edge containing the type character will face the front of the mold. In this position, as shown in Fig. 10, the matrix stands between the lateral part or slide 3 and the projection 5 of the ejector, and when the ejector is advanced toward the slide 3 the matrix will be seized and firmly grasped at both sides. The matrix is secured to the matrix holder 8 (Figs. 4, 11 and 12) in such manner that the front part of the matrix will be free so that the projection 5 and the slide 3 can come directly into contact with the matrix. Owing to this fact, no bur can be produced, which would otherwise be formed by reason of the inadequate contact between the matrix and mold.

The ejector 4 is urged constantly by spring 9 and lever 10 inwardly, and firmly presses the projection 5 against the matrix and the latter against the slide 3. As the matrix, as before stated, is exactly of the same width as the type to be cast, and as the ejector is limited in its movement by contact with the matrix, the width of the mold slot is thus automatically adjusted. If, therefore, a type character of a different width is to be cast, a matrix of corresponding width being employed, the ejector by contact with the new matrix, will adjust the width of the mold slot accordingly. The ejector is withdrawn after the casting operation, by the lever 10 which is pivoted to the machine frame at 11, and is in the form of a bell-crank-lever, being provided with a roller 12 engaged by a cam on a disk 80 mounted on the spindle or shaft 13.

The matrix being grasped only at two sides between the ejector and slide 3, there is the possibility of the formation of burs at the upper and lower sides of the type, and to prevent this and to cast the type free from burs on all sides, I provide the matrix 7, as shown in Fig. 14, with a projection 46' having upper and lower inclined surfaces 60, the type die 47 being formed in the end of the projection. To coöperate with a matrix of this form, the upper and lower parts of the mold are provided with inclined surfaces 48 and 49 corresponding to the inclination of the surfaces 60 and adapted to contact with said surfaces when the matrix is presented to the mold, as shown in Fig. 14. This insures an extended and close contact between the matrix and mold, and the matrix tightly closes the mold at the front, with the result that the metal cannot escape between them and the formation of burs is prevented. With a matrix of this form presented to the mold formed as described to coöperate with it, and with the matrix grasped at opposite sides between the ejector and slide, the type die is effectually closed on all sides and a tight fit between the parts assured, so that the metal injected into the mold being prevented from escape between the contacting parts, a clean cast, free from burs, will result.

In order that a change may be made in the type-body, I propose to adopt the construction shown particularly in Figs. 17, 18 and 19. Here it will be seen that the upper part of the mold is divided into two sections, a section 50 and a section 51, the latter being secured permanently to the lower part 2 of the mold by suitable means. The part 50 is adjustable vertically in a guide 51$^a$ in the part 51, and is adapted to be moved up and down by means of a set screw 52 tapped in an upper projection 59 on the part 51, and having its head engaged with the part 50, so that when the screw is turned it will carry the part 50 up and down with it. By adjusting the part 50 in this manner, the size of the mold cavity may be increased or diminished to produce a type of corresponding "body." The adjusted part 50 is firmly held in its adjusted position by means of screws 53 extending horizontally through vertical slots in the projection 59 of the part 51, and threaded into the adjustable part 50. When the size of the mold cavity is thus changed there must be a corresponding change in the thickness of the ejector, and to meet this condition the ejector, as shown in Fig. 20, is formed in two parts, a main actuating part 55, and a secondary part or ejector proper 54, which parts are detachably connected together by screws 62, so that the ejector proper may be removed and an ejector of different thickness substituted.

In order that the height of the type to be cast may be varied, to the end that a change may be made from one system of type to another, as for instance from the Paris system to the Leipzig or to the English systems, I propose to construct the upper and lower parts of the mold, as shown more particularly in Figs. 13, 14 and 15, in sections divided transversely of the length of the mold cell. In these figures, it will be seen that the parts of the mold are in three sections, a front section consisting of the upper part 50 and the lower part 2$^a$, a central section consisting of the upper part 56 and the lower part 57, and a rear section consisting of the upper and lower parts 58, which parts are secured together, as shown in Fig. 13, by the screws 63. The parts 56 and 67 are adapted to be removed and other parts of a different thickness substituted for them, the substitution of parts of greater thickness increasing the length of the mold cavity and the height of the type, and the substitution of parts of less width decreasing the length of the mold cell and consequent height of the type. The parts 56 and 57 project at their inner ends slightly into the mold cavity and in this manner prevent the formation of burs at this point.

The means for holding and presenting the matrix to the mold are particularly shown in Figs. 4, 5, 7, 11 and 12, the matrix being grasped between the two clamping jaws 64 and 65 drawn together by means of screws 66, and the jaws being so formed that the front portion of the matrix is free, as before described. The matrix may be alined or centered in its holder by any suitable and appropriate means, the means illustrated being that adapted for the monoline matrix and consisting of a projection 67 which engages in one of a number of recesses 68 on the rear edge of the matrix, which recess bears such relation to the type die in the front edge of the matrix that the die will be properly centered relative to the mold cavity when the matrix is presented by its holder to the mold.

The matrix holder is mounted, as shown in Figs. 4, 5 and 7, in the part 14 of the machine frame in such manner that it is capable of slight lateral play, springs 46 being mounted between the edge of the holder and the frame and tending to constantly urge the holder inwardly toward the ejector. When the matrix is presented to the mold and clamped between the ejector and slide, it will yield slightly and thereby prevent any damage to the wall of the type die. The ejector must move back when the matrix is presented to the mold, to such an extent that the space between the projection 5 on the ejector and the slide 3 will be great enough to enable the matrix to be conveniently advanced between these parts. When the matrix is finally seated, the ejector advances and comes to rest with its projection 5 against the matrix. The spring 9 now forces the ejector and the matrix against the part 3, thereby compressing springs 46 and taking up the play between the holder and the part 3, and these parts finally come to rest, with the mold adjusted accurately in accordance with the width of the matrix and the type.

The casting pot 35 may be of any appropriate form of construction, and is shown diagrammatically in Fig. 2, being provided with a nozzle 36 adapted to connect with the rear end of the mold cavity and to introduce the molten metal therein.

After the type is cast the matrix is first removed, and the slide 3 is moved downwardly by means of a lever 15 (Figs 1 and 3) receiving its motion from the cam disk 81, the slide being lowered to such an extent that its upper surface will be flush with the upper surface of the lower part of the mold, the slide in this manner forming a bridge for transferring the cast type into the transport conduit, to be hereinafter described. As a result of this arrangement, a great saving of space is effected compared to former constructions in which separate slides were employed to serve as a bridge in transferring the type. As no separate mechanisms are needed between the mold and the type conduit, these parts can be arranged compactly and the length of the machine reduced. The slide 3 bears at its outer side against a fixed member 17 constituting a fixed bridge in the type conduit, and the slide is urged constantly inwardly and against the mold parts by a spring 16, Fig. 3. This construction enables the mold to expand when heated without jamming the slide.

The entire mold is arranged in such manner that it can be conveniently removed from the machine frame and re-inserted when occasion demands, and it is sustained in a fixed and stable manner by being embedded firmly on three sides on the cast-iron frame 37, as shown in Figs. 3 and 6, the result being that the mold cannot yield to the counter-pressure of the casting pot.

The matrix holder 8 is so mounted on the frame that it may be conveniently removed or interchanged. It is guided in the portion 14 of the frame (Figs. 4 and 5) and is prevented from escape by means of a slide 38 which is inserted beneath a horizontal pin 39 extending between ears rising from the portion 14, and comes to rest in such position that its end will extend over the holder
8. When the holder 8 is to be removed, the slide is drawn to the right from beneath the pin 39 (Fig. 5) by means of the handle a until the end of the slide disengages the holder, whereupon the latter may be lifted from its seat in the frame.

In Figs. 21, 22, 23 and Figs. 24, 25, I show different forms of devices for transferring the cast type from the mold to the type finishing mechanism. In one form of the transferring device, as shown in Figs. 21, 22 and 23, a horizontally movable slide 19 is mounted in the frame and is acted on by a spring 18 fixed at one end as at $18^a$ to the frame of the machine and fixed at its other end as at $18^b$ to the slide 19, which latter, when the slide 3 of the mold descends, advances under the action of the spring and closes against the side of the mold, as shown in Fig. 21. The ejector then advances and ejects the type from the mold, the said type remaining jammed between the ejector and slide 19, and being prevented from tipping or "edging". After the type has been carried over the fixed bridge 17, before alluded to, a projection 21 on slide 19 contacts with a corresponding projection $22^a$ on a coöperating underlying type-guiding slide 22 and causes the latter to participate in its movement, the slide 22 being acted on by a spring $22^b$ fixed at one end as at $22^c$ to the frame and fixed at its other end as at $22^d$ to the slide, and acting to urge the same toward the mold. The front surfaces of the two slides 19 and 22 in this position form a vertical guiding wall, as shown in Fig. 22, which in connection with the side of the fixed bridge 17 constitutes a vertical conduit. The ejector then moves the type forward until it is arrested by the end of slide 19 and is vertically over said conduit. In this position the type is vertically beneath a pusher 23 arranged to slide in the frame, the downward motion of which pusher forces the type down through said conduit. By reason of the spring action of the two slides 19 and 22, the width of said vertical conduit is automatically adjusted for each width of type. Fig. 21 shows the position of the parts at the beginning of the ejecting operation, and Fig. 23 shows the position of the parts after the type has been driven down by the pusher. In this position, the type arrives in front of a second pusher slide 24, the action of which is to advance the type farther and toward the trimming knives 30, Fig. 26.

In the construction shown in Figs. 24 and 25, the slide 19 is omitted and the vertical conduit is formed by the slide 22 in connection with the fixed bridge 17, the slide being forced back directly by the type advanced by the ejector. For guiding the type on the way from the mold to the vertical conduit, a vertically adjustable slide block 25 is employed, which, by means of a projection 26 thereon, rests on the upper part of the mold, as shown in Fig. 24, the lower face of the part 25 forming the upper wall of the horizontal conduit. When the slide 3 returns to its upper position, closing the side of the mold, as shown in Fig. 25, it engages and lifts the part 25 free of the mold.

The ejector 4 must, as before stated, advance the type to such a position that the right-hand edge of the same will be flush with the left-hand edge of the fixed bridge 17, as shown in Fig. 22. In order that the ejector will be arrested at the proper point, it is provided with a stop 27 (Figs. 3 and 4) which, when the ejector is at the end of its ejecting movement, will contact with the bridge 28 on the frame. The bridge 28 is provided with longitudinal holes 29 to receive screws by which it is secured in place. The longitudinal holes are arranged obliquely so that when the bridge is shifted in a transverse direction it will at the same time move longitudinally of the ejector by which means the point at which the ejector will be arrested in its ejecting movement may be varied; and also in the event of wear on the contacting parts, a proper adjustment may be made to maintain their proper action.

The projection 5 on the ejector is so arranged that its rear edge will pass close to the front face of the mold, as shown in Figs. 3 and 4. As a result, the projection will clean the mold of any adhering metal shavings, dirt, or the like.

The type pushed downward by the pusher 23 in the vertical conduit is advanced by slide 24, as described, horizontally in a horizontal conduit leading to the finishing mechanism, shown in Fig. 26, the said finishing mechanism comprising a horizontal conduit formed by two jaws 41 and 42 on opposite sides of which are arranged trimming knives 30, the advancing type passing through the conduit and between the knives and being properly trimmed thereby, and being finally delivered to the type galley 31.

In order to facilitate the cleaning of the parts the slide 24 may be removed from the machine by drawing it out to the right, it being merely necessary to remove a pin 43 which connects the slide with an actuating arm 45, whereupon the slide may be drawn outwardly by means of a handle 44 on the end of the same.

Having thus fully described the nature of my invention, what I desire to secure by patent is:

1. In a type casting machine, the combination of a mold comprising top and bottom parts and movable side parts, said side parts being provided each with a matrix inclosing surface, and the said top and bottom parts being provided each with a distinct matrix inclosing surface discontinuous with and independent of the surfaces of the mold cell, a matrix having a type character thereon and provided adjacent the type character with distinct upper and lower surfaces adapted to coöperate respectively with said inclosing surfaces on the top and bottom parts of the mold, and provided also adjacent said type character with two distinct side surfaces adapted to be clamped between the said inclosing surfaces on the movable parts of the mold.

2. In a type casting machine, the combination with a matrix of a mold comprising top and bottom parts and movable side parts, the parts of the mold having means for inclosing the part of the matrix having the type character, said character being arranged on a projection of the matrix, provided with two oblique lateral surfaces and a straight front surface.

3. In a type casting machine, the combination with a matrix of a mold comprising top and bottom parts and movable side parts, the parts of the mold having means for inclosing the part of the matrix having the type character, said character being arranged on a projection of the matrix, provided with two oblique lateral surfaces and a straight front surface corresponding exactly to the size of the body.

4. In a type casting machine, a mold having fixed top and bottom parts and movable lateral parts, said lateral parts being enlarged in the direction of the length of the type to be cast, and presenting straight parallel inner faces adapted at points beyond the mold cell to inclose the part of the matrix containing the type character.

5. In a type casting machine, a mold having fixed top and bottom parts and movable lateral parts, said lateral parts provided with projections projecting in the direction of the length of the type to be cast and forming straight continuations of the inner faces of said parts, the said projections adapted to inclose the part of the matrix containing the type character.

6. In a type casting machine, the combination of a mold comprising a top part and an underlying connected part projecting at its end beyond the end of the top part and constituting the bottom wall of the mold proper, the end of said top part being extended vertically and provided with a vertical guideway, a movable member mounted to slide in said guideway to and from the bottom wall of the mold and constituting the top wall thereof, coöperating parts constituting the side walls of the mold, a vertical adjusting screw threaded in said vertical extension of the top part and engaging the sliding member, and a horizontal clamping screw extending through said vertical extension and into the sliding member.

7. In a type casting machine, a mold comprising top and bottom parts and movable side parts, the top and bottom parts being divided in the direction of the length of the type to be cast each into two portions, the back portion of the top and bottom parts being exchangeable for the purpose of modifying the height of the type.

8. In a type casting machine, a mold comprising top and bottom parts and movable side parts, the top and bottom parts being divided in the direction of the length of the type to be cast each into two portions, the back portion of the top and bottom parts being exchangeable for the purpose of modifying the height of the type and being set to a slightly smaller body than the front portions for the purpose specified.

9. In a type casting machine in combination a mold comprising top and bottom parts and movable side parts, the parts of the mold having means for inclosing the part of the matrix having the type character, a matrix holder adapted to fixedly clamp the matrix and means for moving it, the matrix holder having a lateral clearance within the means moving it for the purpose specified.

10. In a type casting machine in combination a mold comprising top and bottom parts and movable side parts, the parts of the mold having means for inclosing the part of the matrix having the type character, a matrix holder, means for moving it, the matrix holder having a lateral clearance within the means moving it and means for yieldingly pressing the matrix holder toward the one side, for the purpose specified.

11. In a type casting machine in combination a mold comprising top and bottom parts and movable side parts, the parts of the mold having means for inclosing the part of the matrix having the type character, a matrix holder, means for moving it, the matrix holder having a lateral clearance within the means moving it and means for yieldingly pressing the matrix holder toward the side of the movable ejecting side part of the mold.

12. In a type casting machine, a mold comprising top and bottom parts and movable side parts, one of the side parts forming the ejector for the cast type and having a projection overlapping and passing close in front of the mold, substantially as described.

13. In a type casting machine, a mold comprising top and bottom parts and movable side parts, one of the side parts forming the ejector for the cast type and having a projection passing close in front of the upper and bottom parts of the mold.

14. In a type casting machine, a mold comprising top and bottom parts and movable side parts, one of the side parts forming the ejector for the cast type and having a projection passing so close in front of the mold that during the ejecting movement it simultaneously frees the front side of the mold from impurities, substantially as described.

15. In a type casting machine, a mold comprising top and bottom parts, a movable side part constituting an ejector, and a second movable side part, in combination with a type-guide slide movable to and from the mold and adapted to engage the side of the type when the said second movable part of the mold is operated to open the mold.

16. In a type casting machine, a mold comprising top and bottom parts, a movable side part constituting an ejector, and a second movable side part, in combination with a type-guide slide movable to and from the mold and adapted to yieldingly engage the side of the type when the said second movable part of the mold is operated to open the mold.

17. In a type casting machine, a mold comprising top and bottom parts and movable side parts, one of the side parts forming the ejector in combination with a resilient means for effecting the ejecting movement and adjustable means for limiting said movement, substantially as described.

18. In a type casting machine, a mold comprising top and bottom parts and side parts, in combination with a matrix provided with a projecting portion containing the type character, said projecting portion being adapted to extend and be clamped between the movable mold parts and to be inclosed thereby.

19. In a type casting machine, a mold formed with inclined surfaces, in combination with a matrix formed adjacent the type character with inclined surfaces adapted to coöperate with those on the mold in effecting a closure of the mold.

20. In a type casting machine, a mold formed with upper and lower inclined surfaces and with parallel side surfaces, in combination with a matrix formed adjacent the type character with upper and lower inclined surfaces adapted to coöperate with those on the mold, and formed also with parallel side surfaces adapted to coöperate with said parallel surfaces of the mold.

21. In a type casting machine, a mold comprising top and bottom parts and side parts between which the body of the type is adapted to be cast, said top and bottom parts being divided in the direction of the length of the type into a plurality of sections.

22. In a type casting machine, a mold comprising opposing fixed parts and opposing movable parts between which the body of the type is adapted to be cast, the said fixed parts being divided in the direction of the length of the type into a plurality of sections.

23. A type mold having opposing sides each comprising a plurality of connected interchangeable sections; whereby by the interchange of the sections the effective depth of the mold cell may be varied to produce type of varying heights.

24. In a type casting machine, the combination of a matrix, a matrix holder adapted to fixedly clamp the matrix, and a guide frame in which the holder is movable to present the matrix to the mold, the said holder having a movement in said guide frame relative to its movement in presenting the matrix to the mold.

25. In a type casting machine, a mold having one side movable to serve as an ejector for the type, said movable side being provided with a projection overlapping the face of the mold to clean the same.

26. In a type casting machine, a mold having one side movable to serve as an ejector for the type, said movable side being provided with projections overlapping the face of the mold on opposite sides of the mold cell.

27. In a type casting machine, a mold comprising top and bottom parts, a movable part forming one side of the mold and constituting an ejector, a second movable part forming the other side of the mold, a fixed bridge adjacent the second movable part of the mold with its upper surface in position to receive the ejected type, and a guide slide movable along the top of the bridge and adapted to engage the side of the type when the second movable part of the mold is operated to open the mold, the face of said slide being adapted in connection with the face of the bridge to form a type channel.

28. In a type casting machine, a mold comprising walls, one of which is movable to serve as an ejector, means for moving said wall to eject the type, and an adjustable stop in position to limit the ejecting movement of the same.

29. In a type casting machine, the combination of a mold, an ejector therefor, means for moving the ejector to discharge the type from the mold, a stop device adjustable in the direction of movement of the ejector and adapted to be engaged thereby in the ejecting movement.

In witness whereof I have hereunder set my hand in presence of two witnesses.

HEINRICH DEGENER.

Witnesses:
　HENRY HASPER,
　WOLDEMAR HAUPT.

Copies of this patent may be obtained for five cents each, by addressing the "Commissioner of Patents, Washington, D. C."